(12) United States Patent
Isaji et al.

(10) Patent No.: US 11,002,928 B2
(45) Date of Patent: May 11, 2021

(54) OPTICAL FIBER CABLE

(71) Applicants: FUJIKURA LTD., Tokyo (JP); NIPPON TELEGRAPH AND TELEPHONE CORPORATION, Tokyo (JP)

(72) Inventors: Mizuki Isaji, Sakura (JP); Masatoshi Ohno, Sakura (JP); Shinnosuke Sato, Sakura (JP); Kouji Tomikawa, Sakura (JP); Akira Namazue, Sakura (JP); Ken Osato, Sakura (JP); Naoki Nakagawa, Tsukuba (JP); Yuji Aoyagi, Tsukuba (JP); Shigekatsu Tetsutani, Tsukuba (JP)

(73) Assignees: Fujikura Ltd., Tokyo (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/312,669

(22) PCT Filed: Jul. 31, 2017

(86) PCT No.: PCT/JP2017/027736
§ 371 (c)(1),
(2) Date: Dec. 21, 2018

(87) PCT Pub. No.: WO2018/025814
PCT Pub. Date: Feb. 8, 2018

(65) Prior Publication Data
US 2019/0227248 A1    Jul. 25, 2019

(30) Foreign Application Priority Data
Aug. 4, 2016 (JP) .............................. JP2016-153695

(51) Int. Cl.
*G02B 6/44* (2006.01)

(52) U.S. Cl.
CPC ............. *G02B 6/4433* (2013.01); *G02B 6/44* (2013.01); *G02B 6/4416* (2013.01); *G02B 6/4486* (2013.01)

(58) Field of Classification Search
CPC ........ G02B 6/44; G02B 6/443; G02B 6/4416; G02B 6/4486; G02B 6/4433
See application file for complete search history.

(56) References Cited

U.S. PATENT DOCUMENTS

| | | | | |
|---|---|---|---|---|
| 4,606,604 A | * | 8/1986 | Soodak | G02B 6/4416 385/101 |
| 4,787,705 A | * | 11/1988 | Shinmoto | G02B 6/4416 385/101 |

(Continued)

FOREIGN PATENT DOCUMENTS

| CN | 1961237 A | 5/2007 |
|---|---|---|
| CN | 101943782 A | 1/2011 |

(Continued)

OTHER PUBLICATIONS

Office Action issued in corresponding Japanese Patent Application No. 2016-153695 dated Oct. 3, 2017 (5 pages).

(Continued)

*Primary Examiner* — Thomas A Hollweg
*Assistant Examiner* — Mary A El-Shammaa
(74) *Attorney, Agent, or Firm* — Osha Bergman Watanabe & Burton LLP

(57) ABSTRACT

An optical fiber cable includes: a core comprising gathered optical fibers; an inner sheath housing the core; a wire body embedded in the inner sheath; tension members embedded in the inner sheath, wherein the core is interposed between the tension members; a reinforcing sheet that covers the inner sheath; and an outer sheath that covers the reinforcing sheet, wherein in the inner sheath, $t_i < T_i$ and $t_o < T_o$ are satisfied, where a thickness of a radially inner portion (Continued)

between the core and the wire body is $t_i$, a thickness of a radially inner portion between the core and each of the tension members is $T_i$, a thickness of a radially outer portion between the wire body and the reinforcing sheet is $t_o$, a thickness of a radially outer portion between each of the tension members and the reinforcing sheet is $T_o$.

11 Claims, 12 Drawing Sheets

(56) References Cited

U.S. PATENT DOCUMENTS

| | | | | |
|---|---|---|---|---|
| 5,509,097 | A * | 4/1996 | Tondi-Resta | G02B 6/4403 385/109 |
| 5,604,833 | A * | 2/1997 | Kambe | G02B 6/4427 385/103 |
| 5,651,081 | A * | 7/1997 | Blew | G02B 6/4403 385/101 |
| 5,787,217 | A * | 7/1998 | Traut | G02B 6/4411 385/100 |
| 6,563,990 | B1 * | 5/2003 | Hurley | G02B 6/4422 385/101 |
| 6,853,782 | B2 | 2/2005 | Kobayashi et al. | |
| 7,123,801 | B2 | 10/2006 | Fitz | |
| 9,116,322 | B1 * | 8/2015 | Laws | G02B 6/4433 |
| 10,345,544 | B1 * | 7/2019 | Shen | G02B 6/4429 |
| 2002/0085821 | A1 | 7/2002 | Bourget | |
| 2002/0126970 | A1 | 9/2002 | Anderson et al. | |
| 2003/0118295 | A1 | 6/2003 | Lail et al. | |
| 2006/0104579 | A1 | 5/2006 | Fitz | |
| 2010/0021113 | A1 * | 1/2010 | Ashibe | G02B 6/4416 385/95 |
| 2011/0280527 | A1 | 11/2011 | Tamura | |
| 2013/0183013 | A1 * | 7/2013 | Martin Regalado | B21C 23/24 385/104 |
| 2014/0099062 | A1 | 4/2014 | Bringuier et al. | |
| 2018/0321454 | A1 * | 11/2018 | Sato | G02B 6/4482 |

FOREIGN PATENT DOCUMENTS

| | | |
|---|---|---|
| CN | 203133349 U | 8/2013 |
| EP | 1006384 A1 | 6/2000 |
| EP | 2700990 A1 | 2/2014 |
| JP | H01-257806 A | 10/1989 |
| JP | H06-174985 A | 6/1994 |
| JP | 2001-343569 A | 12/2001 |
| JP | 2003-322782 A | 11/2003 |
| JP | 2006-133686 A | 5/2006 |
| JP | 2007-011020 A | 1/2007 |
| JP | 2009-198701 A | 9/2009 |
| JP | 2009-237341 A | 10/2009 |
| JP | 2012-155230 A | 8/2012 |
| JP | 2013-228567 A | 11/2013 |
| JP | 5568071 B2 | 8/2014 |
| JP | 2015215533 A | 12/2015 |
| TW | 201100890 A | 1/2011 |
| TW | 201218214 A | 5/2012 |

OTHER PUBLICATIONS

Office Action issued in corresponding Japanese Patent Application No. 2016-153695 dated Feb. 6, 2018 (3 pages).

Office Action issued in corresponding Taiwanese Patent Application No. 106125869 dated Apr. 19, 2018 (4 pages).

* cited by examiner

OPTICAL FIBER CABLE

CROSS REFERENCE TO RELATED APPLICATIONS

Priority is claimed on Japanese Patent Application No. 2016-153695, filed on Aug. 4, 2016, the content of which is incorporated herein by reference.

TECHNICAL FIELD

The present invention relates to an optical fiber cable.

BACKGROUND

An optical fiber cable installed, laid, or embedded (hereinafter simply referred to as "installed") in a mountain or a forest may be bitten by a wild animal such as a mouse, a squirrel, or a woodpecker, or be hit by a flying object such as a bullet used in hunting. In such a case, an optical fiber inside the optical fiber cable may be damaged. In order to prevent such damage, the optical fiber cable disclosed in PTL 1 is protected by covering the optical fiber with a reinforcing sheet.

In an optical fiber cable having a reinforcing sheet, when disassembling or connecting the optical fiber after installation, the operation of cutting the reinforcing sheet or the like and drawing out the optical fiber from the inside (hereinafter referred to as "draw-out-operation") is complicated, and the operation time is prolonged. In addition, there is a case where the optical fiber is unexpectedly cut when cutting the reinforcing sheet.

On the other hand, an optical fiber cable of PTL 2 is provided with a core formed by assembling a plurality of optical fibers, an inner sheath accommodating the core therein, a rip cord disposed inside the inner sheath, a reinforcing sheet covering the inner sheath, and an outer sheath covering the reinforcing sheet. In this configuration, after removing the outer sheath and the reinforcing sheet with a tool such as a blade, the inner sheath is torn by the tool and the rip cord is drawn out. Since the inner sheath, a metal tape, and the outer sheath are torn by the rip cord, it is possible to shorten the draw-out-operation time while preventing unexpected cutting of the optical fiber.

CITATION LIST

[PTL 1] Japanese Unexamined Patent Application, First Publication No. H6-174985
[PTL 2] Japanese Unexamined Patent Application, First Publication No. 2013-228567

When performing the draw-out-operation on the optical fiber cable of PTL 2, it is necessary to use the tool twice at the time of cutting the outer sheath and the reinforcing sheet and at the time of cutting the inner sheath. Furthermore, when tearing the reinforcing sheet or the outer sheath using the rip cord, a large force is required.

Therefore, there is a need for an optical fiber cable whereby a draw-out-operation can be more easily performed.

SUMMARY

One or more embodiments of the present invention provide an optical fiber cable whereby a draw-out-operation can be easily performed while protecting the optical fiber with a reinforcing sheet.

An optical fiber cable according to one or more embodiments of the present invention includes a core including gathered optical fibers, an inner sheath that accommodates the core therein, a wire body embedded in the inner sheath, a pair of tension members embedded in the inner sheath with the core interposed therebetween, a reinforcing sheet that covers the inner sheath and the wire body, and an outer sheath that covers the reinforcing sheet, in which in the inner sheath, when a thickness of a radially inner portion from the wire body is $t_i$, a thickness of a radially inner portion from the pair of tension members is $T_i$, a thickness of a radially outer portion from the wire body is $t_o$, a thickness of a radially outer portion from the pair of tension members is $T_o$, $t_i < T_i$ and $t_o < T_o$ are satisfied.

According to the optical fiber cable of the first aspect, in the inner sheath, the thickness $t_o$ of the radially outer portion of the wire body is small, so that when the outer sheath and the reinforcing sheet are cut, the wire body can be easily drawn out from the inner sheath. For example, in a case where $t_o$ is set to 0.3 mm or less, the portion of $t_o$ can be easily broken with a claw or the like.

Since the thickness $t_i$ of the radially inner portion of the portion of the inner sheath in which the wire body is embedded is small, it is possible to draw out the optical fiber by easily tearing the inner sheath from the portion of $t_i$ as a starting point.

In addition, since the core is accommodated in the inner sheath, it is possible to prevent accidental cutting of the optical fiber when cutting the outer sheath and the reinforcing sheet, for example, as compared with a case where the core is not accommodated in the inner sheath.

As described above, according to the above aspect, it is possible to reduce the number of times of use of the tool for cutting, and to easily perform the draw-out-operation without requiring a large force.

In the optical fiber cable according to one or more embodiments of the present invention, a pair of the wire bodies is disposed with the core interposed therebetween in the optical fiber cable according to the first aspect.

According to the second aspect, in the cross-sectional view of the optical fiber cable, the position where the wire body is disposed is symmetrical with the core interposed therebetween. Accordingly, it is possible to suppress the occurrence of uneven stress in the optical fiber cable due to, for example, a change in temperature, and to make it difficult for the optical fiber cable to be twisted.

In the optical fiber cable according to one or more embodiments of the present invention, in an outer peripheral surface of the outer sheath, mark portions are each disposed in portions where the pair of tension members are positioned radially inward in the optical fiber cable according to the first or second aspect.

According to the third aspect, when cutting the outer sheath and the reinforcing sheet, by aligning the position in a circumferential direction of the tool such as a blade with the mark portion, the position of the tool can be easily adjusted to the position of the tension member. As a result, the tool abuts against the tension member when cutting the outer sheath and the reinforcing sheet. Therefore, it is possible to prevent the tool from reaching the optical fiber disposed radially inward of the tension member, erroneously cutting the optical fiber.

In the optical fiber cable according to one or more embodiments of the present invention, a portion of a surface of the wire body is exposed to an outside of the inner sheath through an opening formed in an outer peripheral surface of the inner sheath, in the optical fiber cable according to any one of the first to third aspects.

According to the fourth aspect, the opening is formed in the outer peripheral surface of the inner sheath, and the wire body can be visually recognized from the outside of the inner sheath through the opening. Therefore, it is likely to further draw out the wire body from the inner sheath, and the draw-out-operation can be performed more easily.

In the optical fiber cable according to one or more embodiments of the present invention, a portion of the wire body is fixed to the reinforcing sheet in the optical fiber cable according to the fourth aspect.

According to the fifth aspect, when the reinforcing sheet is deformed to open after the outer sheath and the reinforcing sheet is cut, the wire body fixed to the reinforcing sheet is also moved. As a result, the wire body is naturally drawn out from the inner sheath and the draw-out-operation can be made more efficient.

In the optical fiber cable according to one or more embodiments of the present invention, a plurality of the openings are formed on the outer peripheral surface of the inner sheath at intervals in a longitudinal direction, and the surface of the wire body is exposed to the outside of the inner sheath through the plurality of the openings, in the optical fiber cable according to the fourth or fifth aspect.

According to the sixth aspect, it is possible to reduce the area of each opening, as compared with a case where an opening is formed without a cut line along the longitudinal direction, for example. As a result, in the operation of removing the outer sheath and the reinforcing sheet, the inner sheath is unexpectedly broken to expose the core, and it is possible to prevent the optical fiber from being injured.

In the optical fiber cable according to one or more embodiments of the present invention, the wire body is formed by twisting a plurality of element wires, in the optical fiber cable according to any one of the first to sixth aspects.

According to the seventh aspect, flexibility of the entire wire body can be improved while maintaining the strength in the longitudinal direction of the wire body. As a result, it is possible to further facilitate the step of drawing out the wire body from the inner sheath.

Furthermore, in the longitudinal sectional view of the optical fiber cable, the position in the radial direction of the surface of the wire body periodically varies along the longitudinal direction. As a result, the plurality of openings are formed at intervals in the longitudinal direction on the outer peripheral surface of the inner sheath, and it is possible to easily realize the optical fiber cable in which the wire body is exposed to the outside of the inner sheath through the plurality of openings.

In the optical fiber cable according to one or more embodiments of the present invention, 0.1 [mm]≤$t_i$≤0.3 [mm] is satisfied, in the optical fiber cable according to any one of the first to seventh aspects.

According to the eighth aspect, the thickness $t_i$ of the inner sheath in the radially inner portion from the wire body is thin enough to easily break by hand, for example. Therefore, after the wire body is drawn out, the inner sheath can be broken more easily and the draw-out-operation can be performed more efficient.

In the optical fiber cable according to one or more embodiments of the present invention, $t_o$≤0.3 [mm] is satisfied, in the optical fiber cable according to any one of the first to eighth aspects.

According to the ninth aspect, the thickness $t_o$ of the outer peripheral portion of the inner sheath in the portion where the wire body is embedded is thin enough to easily break the outer peripheral portion with a claw or the like. Therefore, the wire body can be easily drawn out from the inner sheath.

In the optical fiber cable according to one or more embodiments of the present invention, 0.1 [mm]≤$t_o$0.3 [mm] and $t_i$=0 [mm] are satisfied, in the optical fiber cable according to any one of the first to ninth aspects.

According to the tenth aspect, since the thickness of the radially outer portion from the wire body in the inner sheath is 0.1 to 0.3 mm, the portion of the inner sheath in which the wire body is embedded can be easily broken by the claw or the like and the wire body can be drawn out from the inner sheath. In addition, since the thickness of the radially inner portion from the wire body is 0 mm, when the wire body is drawn out from the inner sheath, the inner sheath naturally breaks to expose the core.

Furthermore, since the thickness of the radially inner portion from the wire body in the inner sheath is 0 mm, it is possible to cover the core with the inner sheath in a state where the wire body is in contact with the core, and the optical fiber cable is manufactured more easily.

An optical fiber cable according to one or more embodiments of the present invention includes a core including gathered optical fibers, an inner sheath that accommodates the core therein, a pair of tension members embedded in the inner sheath with the core interposed therebetween, a reinforcing sheet that covers the inner sheath, and an outer sheath that covers the reinforcing sheet, in which the inner sheath is formed with a groove portion extending radially inward from an outer peripheral surface of the inner sheath.

According to the eleventh aspect, when the inner sheath is pulled in the radial direction, the stress due to the pulling is concentrated on the groove portion formed in the outer peripheral surface of the inner sheath. As a result, the inner sheath can be easily torn with the groove portion as a starting point, and the optical fiber can be drawn out.

According to the above embodiments of the present invention, it is possible to provide the optical fiber cable that can easily perform the draw-out-operation while protecting the optical fiber with the reinforcing sheet.

DETAILED DESCRIPTION OF EMBODIMENTS

Figure 1:
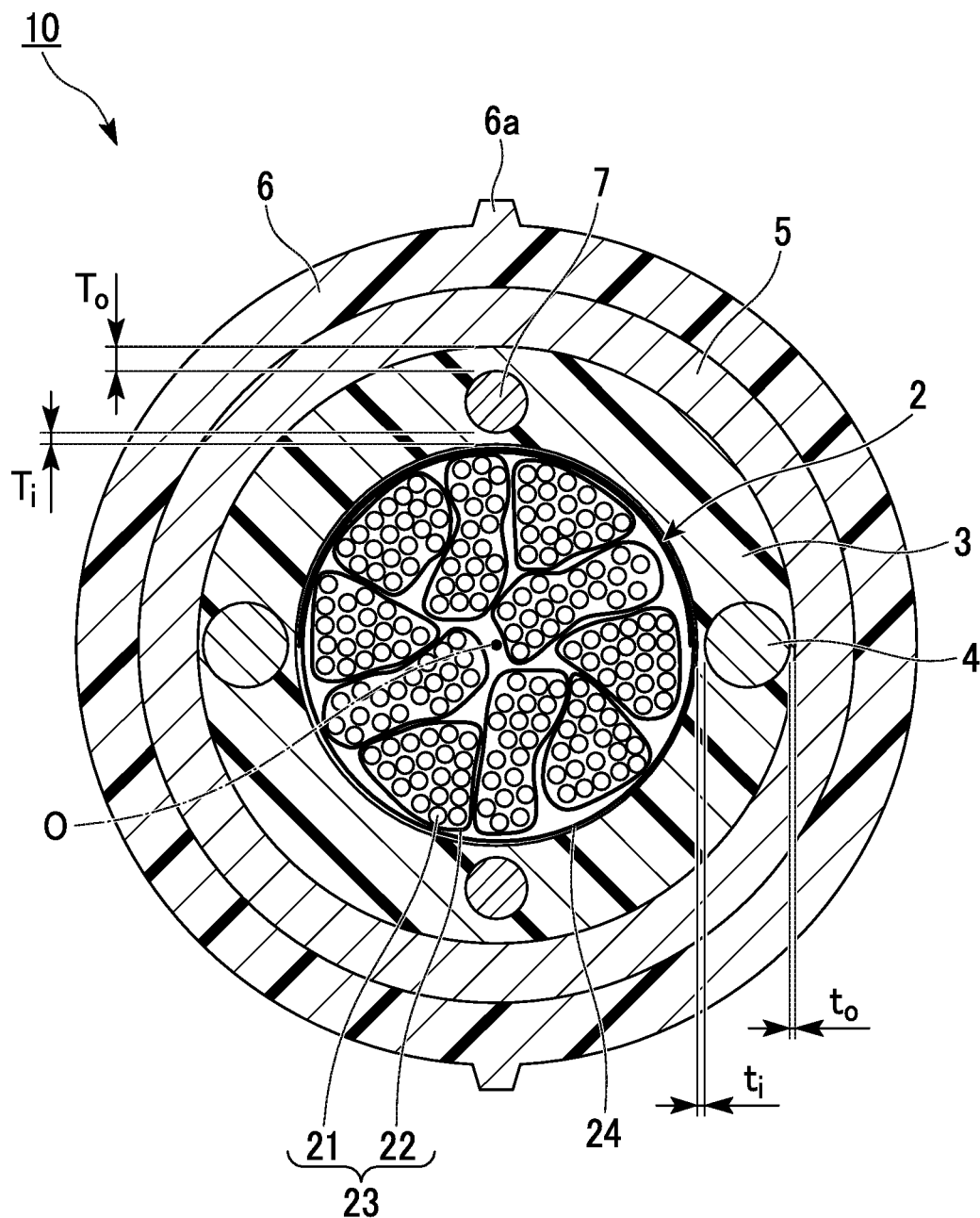
FIG. 1 is a cross-sectional view illustrating a structure of an optical fiber cable according to one or more embodiments of the present invention.

Hereinafter, a configuration of an optical fiber cable 10 according to one or more embodiments of the present invention will be described with reference to FIGS. 1 and 2. In the drawings used in the following description, the scale is appropriately changed in order to make it possible to recognize the shape of each component member.

As illustrated in FIG. 1, the optical fiber cable 10 is provided with a core 2, an inner sheath 3, a pair of wire bodies 4, a pair of tension members 7, a reinforcing sheet 5, and an outer sheath 6.

(Direction Definition)

In one or more embodiments of the present invention, the inner sheath 3, the reinforcing sheet 5, and the outer sheath 6 are formed in a tubular shape having a common center axis O.

In one or more embodiments of the present invention, a direction along the center axis O is referred to as a longitudinal direction. In addition, a section orthogonal to the longitudinal direction is referred to as a cross section, and a section along the longitudinal direction is referred to as a longitudinal section. In addition, in a cross-sectional view, a direction orthogonal to the center axis O is referred to as a radial direction, and a direction revolving around the center axis O is referred to as a circumferential direction.

(Core)

The core 2 is formed by assembling a plurality of optical fibers 21. The core 2 is provided with a plurality of optical fiber units 23 each separately having the plurality of optical fibers 21, and a wrapping tube 24 wrapping these optical fiber units 23. In the example of FIG. 1, each optical fiber unit 23 has twenty optical fibers 21, and the wrapping tube 24 wraps ten optical fiber units 23. As a result, the core 2 includes a total of 200 optical fibers 21. The number of the optical fibers 21 included in the core 2 may be appropriately changed.

As the wrapping tube 24, for example, a water absorbing tape may be used. Although the cross-sectional shape of the core 2 in one or more embodiments is circular, it is not limited thereto, and the shape may be a non-circular shape such as an elliptical shape. The core 2 need not be provided with the wrapping tube 24.

The optical fiber unit 23 is provided with, for example, twenty optical fibers 21 and a bundling material 22 for bundling these optical fibers 21. As the optical fiber 21, an optical fiber core wire, an optical fiber element wire, or the like can be used. The optical fiber unit 23 is a so-called intermittent adhesive type. In a core wire of intermittent adhesive tape, when the bundle of the optical fibers 21 is pulled in a direction orthogonal to an extending direction thereof, the optical fibers 21 are adhered to each other so as to spread in a mesh shape (spider web shape). Specifically, one optical fiber 21 is adhered to the optical fibers 21 on both sides thereof at different positions in the longitudinal direction. Furthermore, the adjacent optical fibers 21 are adhered to each other with a predetermined interval in the longitudinal direction.

The aspect of the optical fiber 21 included in the core 2 is not limited to the core wire of intermittent adhesive tape and may be changed as appropriate.

(Inner Sheath)

The inner sheath 3 has a role of accommodating the core 2 therein and protecting the core 2. As the material of the inner sheath 3, polyolefin (PO) resins such as polyethylene (PE), polypropylene (PP), ethylene ethyl acrylate copolymer (EEA), ethylene vinyl acetate copolymer (EVA), and ethylene propylene copolymer (EP), polyvinyl chloride (PVC) or the like can be used.

In the cross-sectional view, the thickness in the radial direction of the inner sheath 3 varies in the circumferential direction, and the thickness is the thinnest in a portion where the wire body 4 is embedded. In one or more embodiments of the present invention, the thickness in the radial direction of the inner sheath 3 is illustrated as follows. In the inner sheath 3, a thickness of a radially inner portion from the wire body 4 is illustrated as $t_i$, a thickness of a radially outer portion from the wire body 4 is illustrated as $t_o$, thicknesses of radially inner portions from a pair of tension members 7 is illustrated as $T_i$, and thicknesses of radially outer portions from a pair of tension members 7 is illustrated as $T_o$.

In one or more embodiments of the present invention, the $t_i$ is 0.3 mm or less. $t_i$ need not be 0.3 mm or less over the entire length in the longitudinal direction of the inner sheath 3, and a portion of the longitudinal direction may be within this numerical value range. In addition, the wire body 4 may be embedded in the inner sheath 3 in a state where $t_i$ is 0 mm partially in the longitudinal direction, that is, the wrapping tube 24 and the wire body 4 are in contact with each other.

In one or more embodiments of the present invention, $t_o$ is 0.3 mm or less. In order to prevent the inner sheath 3 from unexpectedly breaking, $t_i$ and $t_o$ are set so that neither are 0 mm.

For example, $t_o$ may be 0.1 to 0.3 mm and $t_i$ may be 0 mm. The thickness of the inner sheath 3 need not be within the above range over the entire length of the optical fiber cable 10, and may be within the above range at least in a portion of the longitudinal direction.

(Wire Body)

The pair of wire bodies 4 are embedded in the inner sheath 3 and have a role of facilitating the operation of drawing out the core 2 from the inside of the inner sheath 3. The pair of wire bodies 4 extend in the longitudinal direction of the optical fiber cable 10. As the wire body 4, a cylindrical rod made of PP, nylon, or the like can be used.

The pair of wire bodies 4 are disposed so as to interpose the core 2 in the radial direction. In addition, the pair of wire bodies 4 are disposed at equal intervals in the radial direction from the core 2. As a result, the wire body 4 is disposed at a position symmetrical with respect to the core 2. The number of the wire bodies 4 embedded in the inner sheath 3 may be 1 or 3 or more. In a case where 3 or more wire bodies 4 are embedded in the inner sheath 3, each of the wire bodies 4 are disposed at equal intervals in the radial direction and at equal intervals in the circumferential direction from the core 2. Accordingly, each of the wire bodies 4 can be disposed at a position symmetrical with respect to the core 2.

(Tension Member)

The pair of tension members 7 are embedded in the inner sheath 3. The pair of tension members 7 extend in the longitudinal direction of the optical fiber cable 10. The pair of tension members 7 has a role of improving the strength in the longitudinal direction of the optical fiber cable 10. As a material of the tension member 7, for example, a metal wire (steel wire or the like), a tension fiber (aramid fiber or the like), FRP or the like can be used.

The pair of tension members 7 are disposed with the core 2 interposed in the radial direction. In addition, the pair of tension members 7 are disposed at equal intervals in the radial direction from the core 2. As a result, in the cross-sectional view, the position where the tension member 7 is disposed is symmetrical with the core 2 interposed therebetween. Accordingly, it is possible to suppress the occurrence of uneven stress in the optical fiber cable 10 due to, for example, a change in temperature, and to make it difficult for the optical fiber cable 10 to be twisted.

The number of tension members 7 embedded in the inner sheath 3 may be 1 or 3 or more.

In a case where 3 or more tension members 7 are embedded in the inner sheath 3, each tension member 7 is disposed at equal intervals in the radial direction from the core 2 and at equal intervals from each other in the circumferential direction. Accordingly, these tension members can be disposed at symmetrical positions with respect to the core 2. For example, in a case where the number of tension members 7 is four, two of these are taken as a pair, and each of two pairs of tension members 7 may be embedded in the inner sheath 3 with the core 2 interposed therebetween.

In one or more embodiments of the present invention, the pair of tension members 7 and a pair of wire bodies 4 are embedded in the inner sheath 3 so that intervals in the circumferential direction between the tension member 7 and the wire body 4 adjacent in the circumferential direction are equal to each other.

(Reinforcing Sheet)

The reinforcing sheet 5 covers the inner sheath 3 and the pair of wire bodies 4. The reinforcing sheet 5 has a role of protecting the core 2 from a flying object such as a bullet for hunting or feeding damage of animals. As the reinforcing sheet 5, for example, a corrugated iron tape can be used. As a material of the reinforcing sheet 5, nonwoven fabrics such as glass fibers and aramid fibers may be used, in addition to iron alloys such as stainless steel, and metals such as copper and copper alloys. Alternatively, a thermoplastic resin such as polyethylene, polypropylene, polyester, PBT, and Ny, or a thermosetting resin such as epoxy may be used as the reinforcing sheet 5. The thickness of the reinforcing sheet 5 may be, for example, 0.1 to 0.3 mm By setting the thickness of the reinforcing sheet 5 within this range, it is possible to prevent the optical fiber 21 from being damaged due to feeding damage of animals, and to suppress the volume and weight of the entire optical fiber cable 10.

The reinforcing sheet 5 of one or more embodiments is molded in a tubular shape by longitudinally winding around the inner sheath 3. The reinforcing sheet 5 may be laterally wound or helically wound around the inner sheath 3.

(Outer Sheath)

The outer sheath 6 covers the reinforcing sheet 5. As the material of the outer sheath 6, PO resin such as PE, PP, EEA, EVA, and EP, or PVC can be used.

On the outer peripheral surface of the outer sheath 6, a pair of protrusions (mark portions) 6a extending along the longitudinal direction is formed. Each of the protrusions 6a is disposed on a portion of the outer peripheral surface of the outer sheath 6 where the pair of tension members 7 are positioned radially inward. Since the protrusion 6a is used for aligning the position of a tool K described later, other embodiments may be adopted. For example, instead of the protrusion 6a, a recessed portion recessed radially inward from the outer peripheral surface of the outer sheath 6 or a mark portion such as marking by paint may be adopted.

Capsaicin or the like may be included in the material forming the outer sheath 6. In this case, for example, it is possible to prevent the animal such as a mouse from chewing the outer sheath 6.

In one or more embodiments of the present invention, the thickness $t_i$ on the inner side of the wire body 4 in the inner sheath 3 is smaller than the thickness $T_i$ on the inner side of the tension member 7. In addition, in the inner sheath 3, the thickness $t_o$ on the outer side of the wire body 4 is smaller than the thickness $T_o$ on the outer side of the tension member 7. That is, $t_i<T_i$ and $t_o<T_o$ are satisfied.

Next, the operation of the optical fiber cable 10 configured as described above will be described.

Figure 2:
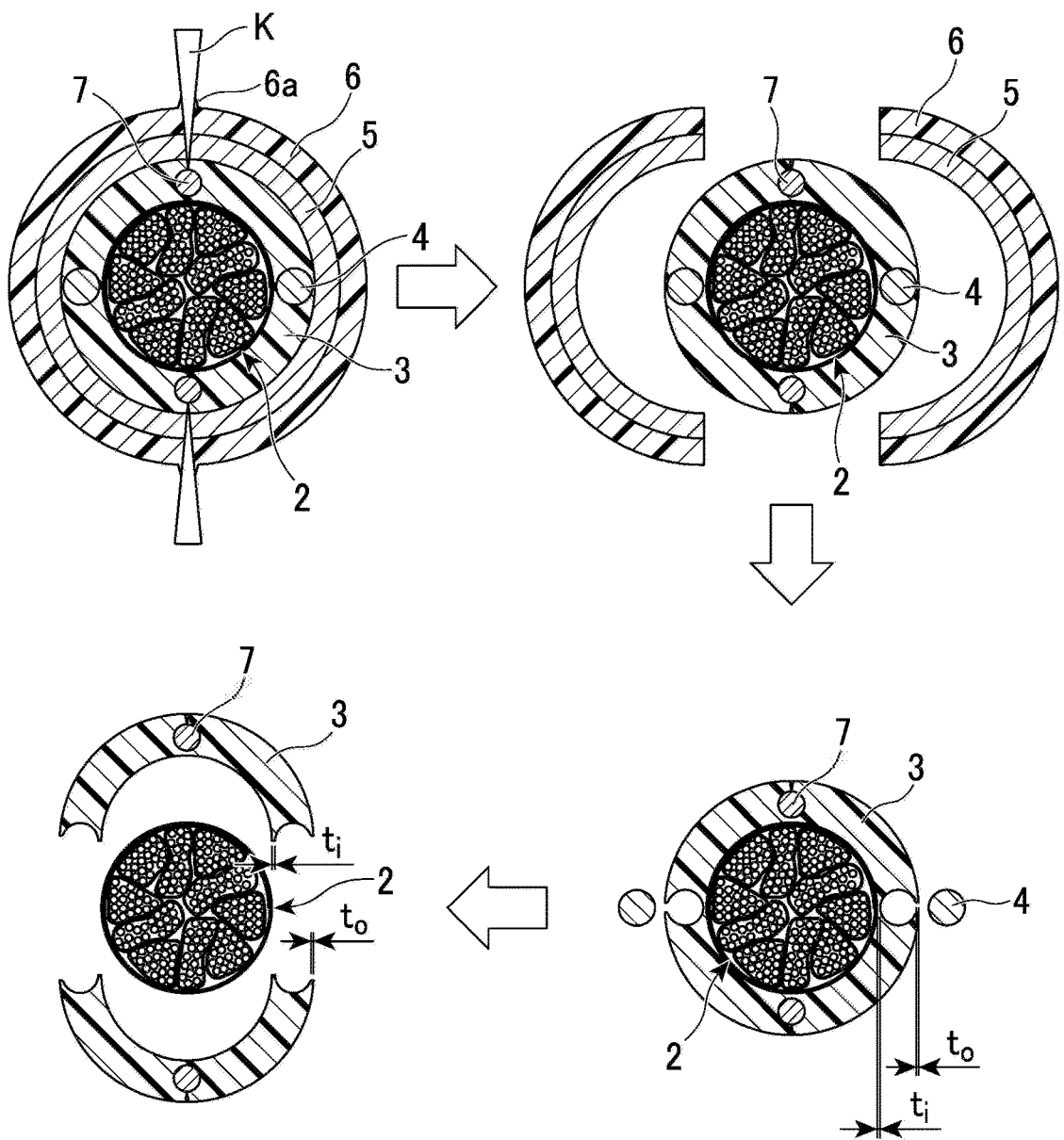
FIG. 2 is an explanatory view illustrating a step during a draw-out-operation of the optical fiber cable illustrated in FIG. 1.

When a draw-out-operation of the optical fiber cable 10 is performed, first, as illustrated in an upper-left part of FIG. 2, the tip end portion of the tool K such as a blade is aligned with the position of the protrusion 6a and the outer sheath 6 and the reinforcing sheet 5 are cut. At this time, the tip end portion of the tool K abuts against the tension member 7, and is prevented from entering further radially inward. As illustrated in an upper-right part of FIG. 2, with the tool K, the outer sheath 6 and the reinforcing sheet 5 are divided into two halves and have a semi-cylindrical shape. In this state, the outer sheath 6 and the reinforcing sheet 5 are pushed out radially outward, and the surface of the inner sheath 3 is visually observed or touched by hand. Accordingly, it is possible to ascertain the thickness $t_o$ portion of the inner sheath 3 where the wire body 4 is embedded. This $t_o$ portion can be easily broken by a claw or the like and the surface of the wire body 4 can be exposed from the broken portion. After exposing the wire body 4, the wire body 4 is deformed or the inner sheath 3 is deformed to draw out the wire body 4 radially outward. Accordingly, as illustrated in a lower-right part of FIG. 2, the wire body 4 can be removed from the inner sheath 3. In this state, when a tensile force in the vertical direction in FIG. 1 is applied to the inner sheath 3, as illustrated in a lower-left part of FIG. 2, the inner sheath 3 is easily broken with the portion of the inner thickness $t_i$ of the wire body 4 as a starting point. As a result, the core 2 is exposed and the draw-out-operation is completed.

Although the optical fiber 21 is wound by the wrapping tube 24, since the wrapping tube 24 is a water absorbing tape or the like, it is easy to break and can be easily removed.

Next, the results of comparative experiments on the outer diameter and mass of the optical fiber cable 10 of one or more embodiments and the structure in the related art of the optical fiber cable, and the required time at the draw-out-operation will be described.

Figure 11:
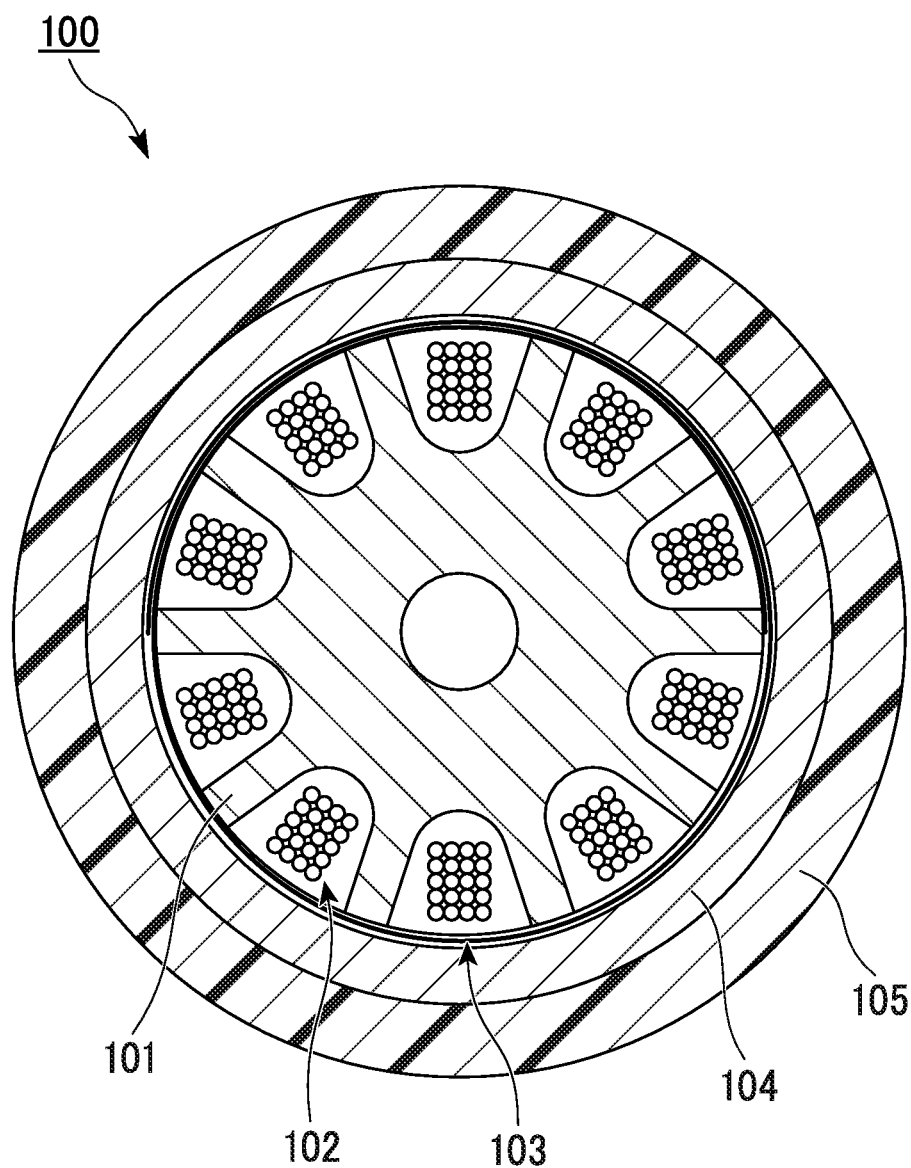
FIG. 11 is a cross-sectional view illustrating a structure of a slot type optical fiber cable in the related art (structure 1 in the related art).

An optical fiber cable 100 of a structure 1 in the related art illustrated in FIG. 11 is a so-called slot type optical fiber cable. The optical fiber cable 100 includes a slot rod 101, a plurality of optical fiber units 102 each having a plurality of optical fibers, a wrapping tube 103, a reinforcing sheet 104, and an outer sheath 105. The wrapping tube 103, the reinforcing sheet 104, and the outer sheath 105 are the same as each of the constituent members of the optical fiber cable 10 of one or more embodiments illustrated in FIG. 1.

In the draw-out-operation of the optical fiber cable 100, after cutting the outer sheath 105 and the reinforcing sheet 104 with a tool such as a blade, the wrapping tube 103 is removed and an optical fiber unit 102 accommodated in a groove portion of the slot rod 101 is drawn out.

Figure 12:
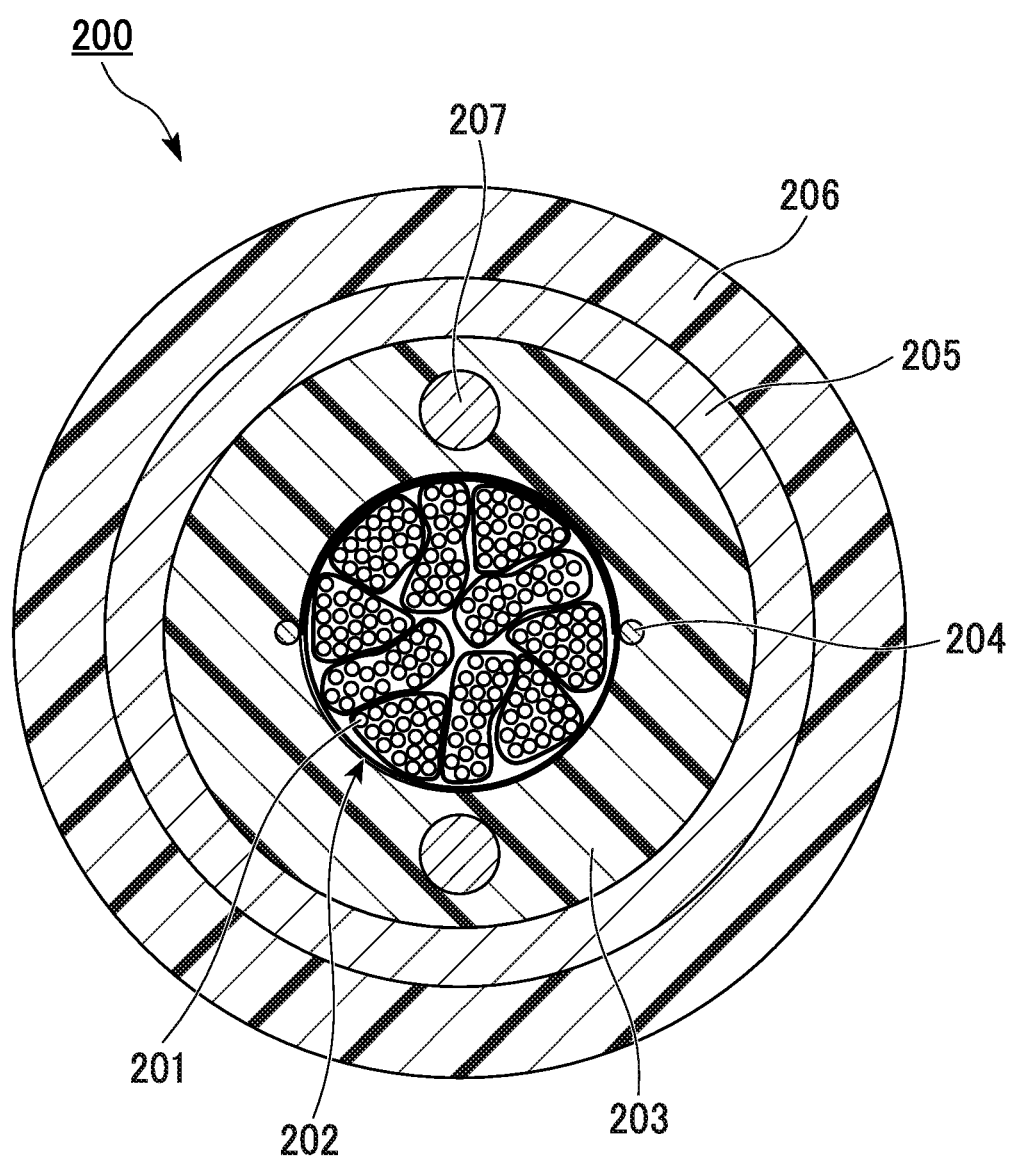
FIG. 12 is a cross-sectional view illustrating a structure of a high density type optical fiber cable in the related art (structure 2 in the related art).

An optical fiber cable 200 of a structure 2 in the related art illustrated in FIG. 12 is a so-called high-density type optical fiber cable. The optical fiber cable 200 is provided with a plurality of optical fiber units having a plurality of optical fibers 201, a wrapping tube 202, an inner sheath 203, a pair of rip cords 204, a reinforcing sheet 205, an outer sheath 206, and a pair of tension members 207. The wrapping tube 202, the inner sheath 203, the reinforcing sheet 205, the outer sheath 206, and the tension member 207 are the same as each of the constituent members of the optical fiber cable 10 of one or more embodiments illustrated in FIG. 1.

In the draw-out-operation of the optical fiber cable 200, after cutting the outer sheath 206 and the reinforcing sheet 205 with the tool such as the blade, the inner sheath 203 is cut and a pair of rip cords 204 is drawn out. The inner sheath 203, the reinforcing sheet 205, and the outer sheath 206 are torn by pulling the pair of rip cords 204 radially outward. Thereafter, the wrapping tube 202 is removed and the optical fiber 201 is drawn out.

Table 1 illustrates the results of relative comparison of the outer diameter, the mass, and the draw-out-operation time for the optical fiber cable 100 (structure 1 in the related art), the optical fiber cable 200 (structure 2 in the related art), and the optical fiber cable 10 (one or more embodiments). "Draw-out-operation time" is the time required from drawing out the optical fiber from the inside of the cable within the range of 10 cm in the longitudinal direction, for example.

TABLE 1

| Items | Structure 1 in the related art | Structure 2 in the related art | Embodiments |
| --- | --- | --- | --- |
| Outer diameter | 1 | 0.78 | 0.76 |
| Mass | 1 | 0.55 | 0.52 |
| Draw-out-operation time | 1 | 1.52 | 0.98 |

When comparing the outer diameter and the mass, the outer diameter and the mass of the optical fiber cables of the structure 2 in the related art and of one or more embodiments are smaller than that of the structure 1 in the related art. This is because the optical fiber cable 100 of the structure 1 in the related art has the slot rod 101, whereas the optical fiber cables of the structure 2 in the related art and one or more embodiments do not have such a slot rod. Since the constituent members of the structure 2 in the related art and one or more embodiments are substantially the same as each other, these are equal to each other in the outer diameter and the mass.

When comparing the draw-out-operation time, the structure 1 in the related art and one or more embodiments are equal to each other, whereas the structure 2 in the related art is longer by 50% or more. The reason for this will be described below. In the structure 2 in the related art, the outer sheath 206 and the reinforcing sheet 205 are cut, and the inner sheath 203 is further cut. In this manner, since the step of using the tool is twice, the operation time is prolonged. On the other hand, in the structure 1 in the related art and one or more embodiments, since there is no step of cutting the inner sheath with the tool, the operation time is relatively short.

In this manner, in the optical fiber cable 10 of one or more embodiments, downsizing, weight reduction, and reduction of the draw-out-operation time are realized as compared with the structure 1 in the related art and the structure 2 in the related art.

As described above, according to the optical fiber cable 10 of one or more embodiments, since the thickness $t_o$ of the inner sheath 3 on the outer side of the wire body 4 is small, the portion where the wire body 4 is embedded can be easily confirmed by visually observing or touching the inner sheath 3 by hand. Furthermore, this $t_o$ portion can be easily broken by a claw or the like, and the surface of the wire body 4 can be exposed from the broken portion.

Therefore, when the outer sheath 6 and the reinforcing sheet 5 are cut, the wire body 4 can be easily drawn out from the inner sheath 3. Since the thickness $t_i$ of the inner sheath 3 on the inner side of the wire body 4 is small, it is possible to easily tear the inner sheath 3 from this portion as a starting point and draw out the optical fiber 21.

In addition, since the core 2 is accommodated in the inner sheath 3, it is possible to prevent accidental cutting of the optical fiber 21 when cutting the outer sheath 6 and the reinforcing sheet 5 as compared with a case where the core 2 is not accommodated in the inner sheath 3.

As described above, according to the optical fiber cable 10 of one or more embodiments, it is possible to reduce the number of times of use of the tool for cutting and to easily perform the draw-out-operation without requiring a large force.

In addition, since a pair of the wire body 4 and a pair of the tension member 7 are each disposed with the core 2 interposed therebetween, the position where the wire body 4 and the tension member 7 are disposed is symmetrical with the core 2 interposed therebetween, in the cross-sectional view of the optical fiber cable 10. As a result, it is possible to suppress the occurrence of uneven stress in the optical fiber cable 10 due to, for example, a change in temperature, and to make it difficult for the optical fiber cable 10 to be twisted.

In addition, the protrusions 6a are disposed on each of the portions of the outer peripheral surface of the outer sheath 6 where the pair of tension members 7 are positioned radially inward. Therefore, when cutting the outer sheath 6 and the reinforcing sheet 5, the position of the tool such as a blade in the circumferential direction can be easily adjusted to the position of the tension member 7. As a result, when the outer sheath 6 and the reinforcing sheet 5 are cut, the tool abuts against the tension member 7, so that it is possible to prevent the tool from reaching the optical fiber 21 disposed radially inward from the tension member 7 and erroneously cutting the optical fiber 21.

In addition, in a case where $t_o \leq 0.3$ [mm] is satisfied, a portion of the inner sheath 3 outside the wire body 4 can be easily torn by a claw or the like.

In addition, in a case where $t_i \leq 0.3$ [mm] is satisfied, after drawing out the wire body 4 from the inner sheath 3, it is possible to easily break the inside portion of the wire body 4 of the inner sheath 3, for example, by manual work, and to make the draw-out-operation more efficient.

In addition, in a case where $0.1$ [mm] $\leq t_o \leq 0.3$ [mm] and $t_i = 0$ [mm] are satisfied, the portion of the inner sheath 3 in which the wire body 4 is embedded can be easily broken by a claw or the like to draw out the wire body 4 from the inner sheath 3. In addition, when the wire body 4 is drawn out from the inner sheath 3, the inner sheath 3 naturally breaks and the wrapping tube 24 can be exposed. Furthermore, by setting $t_i=0$ [mm], it is possible to cover the inner sheath 3 on the core 2 in a state where the wire body 4 is in contact with the wrapping tube 24, and to provide the optical fiber cable 10 which is easier to manufacture.

Next, embodiments of the present invention will be described, and the basic configuration is the same as that of the aforementioned embodiments. Therefore, the same reference numerals are given to similar configurations, the explanation thereof will not be repeated, and only different points will be described.

Figure 3A:
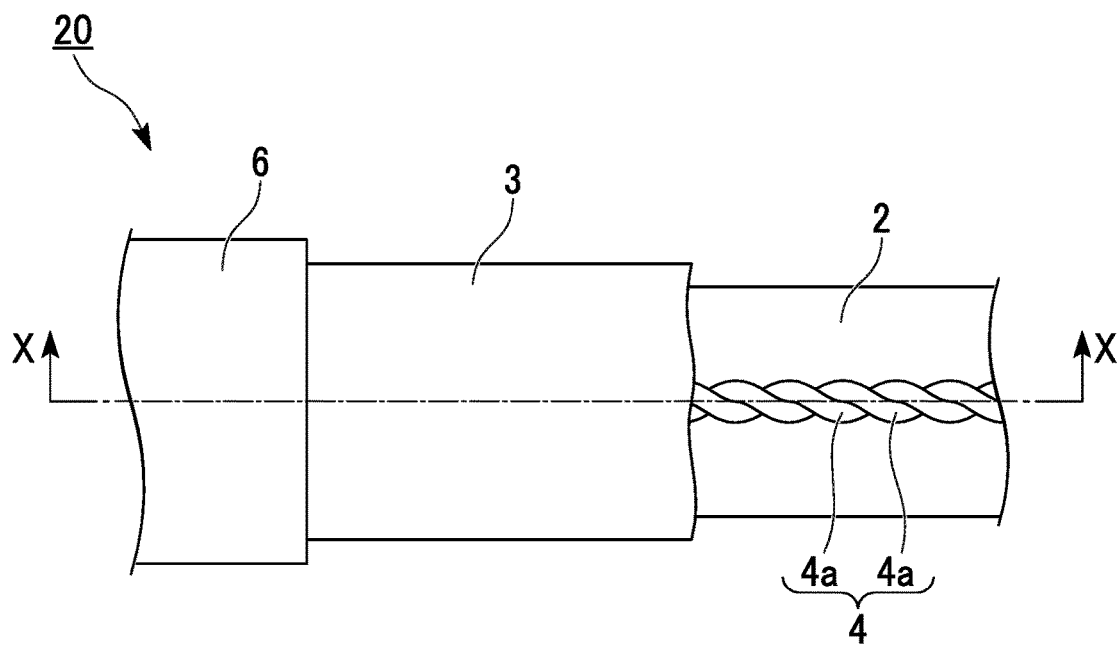
FIG. 3A is an explanatory view illustrating a structure of an optical fiber cable according to one or more embodiments of the present invention.
Figure 3B:
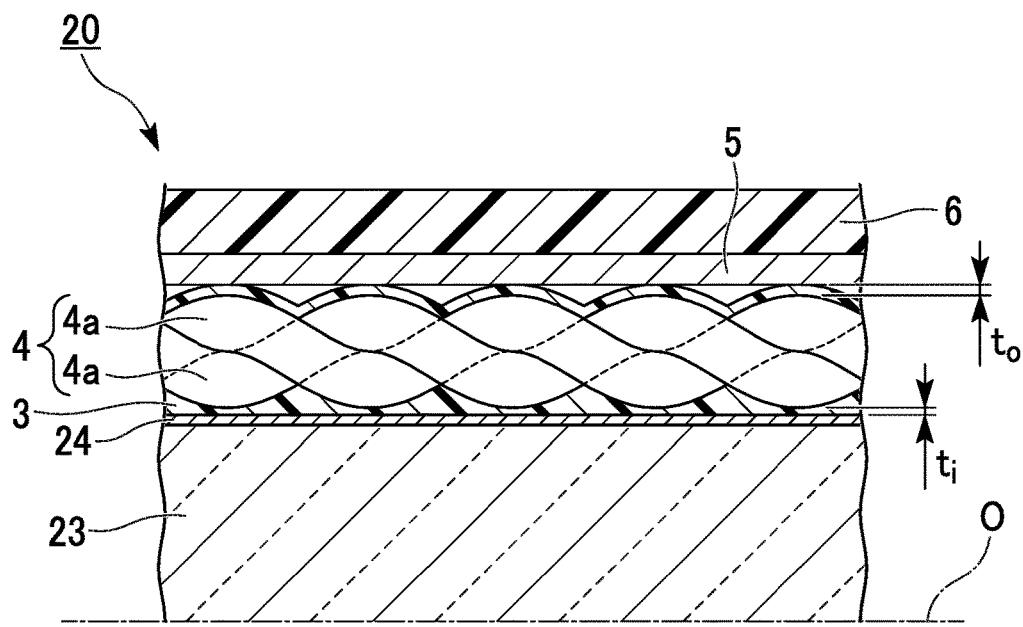
FIG. 3B is a sectional view taken along arrow X-X in FIG. 3A.

As illustrated in FIGS. 3A and 3B, in an optical fiber cable 20 of one or more embodiments, the configurations of the wire body 4 and the inner sheath 3 are different from those of the aforementioned embodiments.

The wire body 4 in one or more embodiments is formed of a yarn obtained by twisting fibers such as PP and polyester. In the example illustrated in FIGS. 3A and 3B, the wire body 4 is formed by further twisting a plurality of element wires 4a which are yarns. FIG. 3A is an explanatory view illustrating a configuration of the optical fiber cable 20 according to one or more embodiments, and illustration of each configuration is partially omitted. Specifically, the outer sheath 6 and the reinforcing sheet 5 are not illustrated on the central portion, and the outer sheath 6, the reinforcing sheet 5, and the inner sheath 3 are not illustrated on the right portion in the lateral direction in FIG. 3A.

FIG. 3B is a sectional view taken along arrow X-X in FIG. 3A. In FIG. 3B, the optical fiber unit 23 is indicated by hatching. As illustrated in FIG. 3B, in the longitudinal sectional view, the position in the radial direction on the surface of the wire body 4 periodically varies along the longitudinal direction. In addition, the inner sheath 3 is covered on the surface of the wire body 4 so that the thickness $t_o$ on the outer side of the wire body 4 is substantially constant. As a result, the unevenness is formed on the surface of the inner sheath 3 along the longitudinal direction.

As illustrated in FIG. 3B, in the optical fiber cable 20 of one or more embodiments, the inner thickness $t_i$ of the wire body 4 of the inner sheath 3 periodically varies along the longitudinal direction. In one or more embodiments, the minimum value of the thickness $t_i$ of the inside of the wire body 4 is 0.1 to 0.3 mm.

Table 2 illustrates the results of relative comparison of the outer diameter, the mass, and the draw-out-operation time for the optical fiber cable 100 (structure 1 in the related art), the optical fiber cable 10 (identified as Embodiments (1) in the table), and the optical fiber cable 20 (identified as Embodiments (2) in the table). In this comparative experiment, a nylon rod was used as the wire body 4 of the optical fiber cable 10, and a yarn obtained by twisting PP fibers was used as the wire body 4 of the optical fiber cable 20. The other conditions are the same as the comparative experiment illustrated in Table 1.

TABLE 2

| Items | Structure 1 in the related art | Embodiments (1) | Embodiments (2) |
| --- | --- | --- | --- |
| Outer diameter | 1 | 0.76 | 0.75 |
| Mass | 1 | 0.52 | 0.50 |
| Draw-out-operation time | 1 | 0.98 | 0.71 |

As illustrated in Table 2, when comparing Embodiments (1) and Embodiments (2), the outer diameter and the mass are equal to each other. This is because the difference between Embodiments (1) and Embodiments (2) is only the form of the wire body 4 and the inner sheath 3. On the other hand, the draw-out-operation time is reduced by 20% or more in Embodiments (2) compared to Embodiments (1). This is because it is possible to more easily recognize the portion of the inner sheath 3 in which the wire body 4 is embedded by visually observing or touching by hand, since the unevenness along the longitudinal direction is formed on the surface of the inner sheath 3. Furthermore, this is because the step of drawing out the wire body 4 from the inner sheath 3 becomes easier, since the yarn rich in flexibility is used as the wire body 4 of Embodiments (2).

As described above, according to the optical fiber cable 20 of one or more embodiments, the unevenness along the longitudinal direction is formed on the surface of the inner sheath 3. Therefore, by observing visually or touching by hand, it is possible to easily recognize the portion of the inner sheath 3 in which the wire body 4 is embedded.

In one or more embodiments, the thickness $t_o$ of the inner sheath 3 on the outer side of the wire body 4 is constant, and this value of $t_o$ may vary along the longitudinal direction.

Figure 4A:
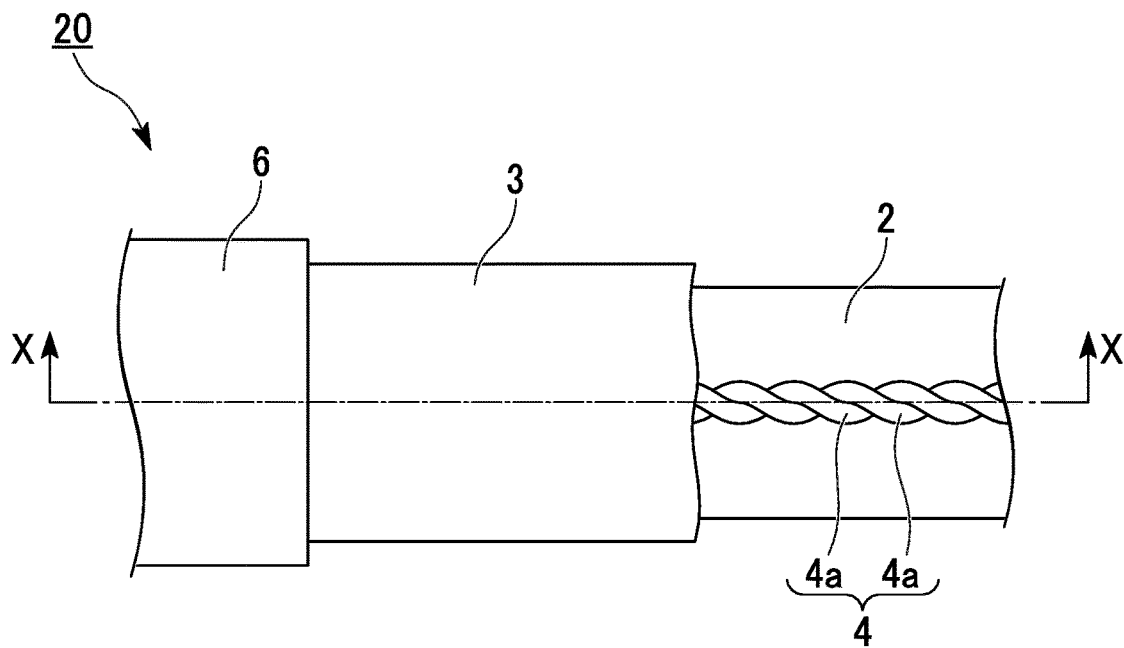
FIG. 4A is an explanatory view illustrating a structure of an optical fiber cable according to a modified example of one or more embodiments illustrated in FIG. 3A.
Figure 4B:
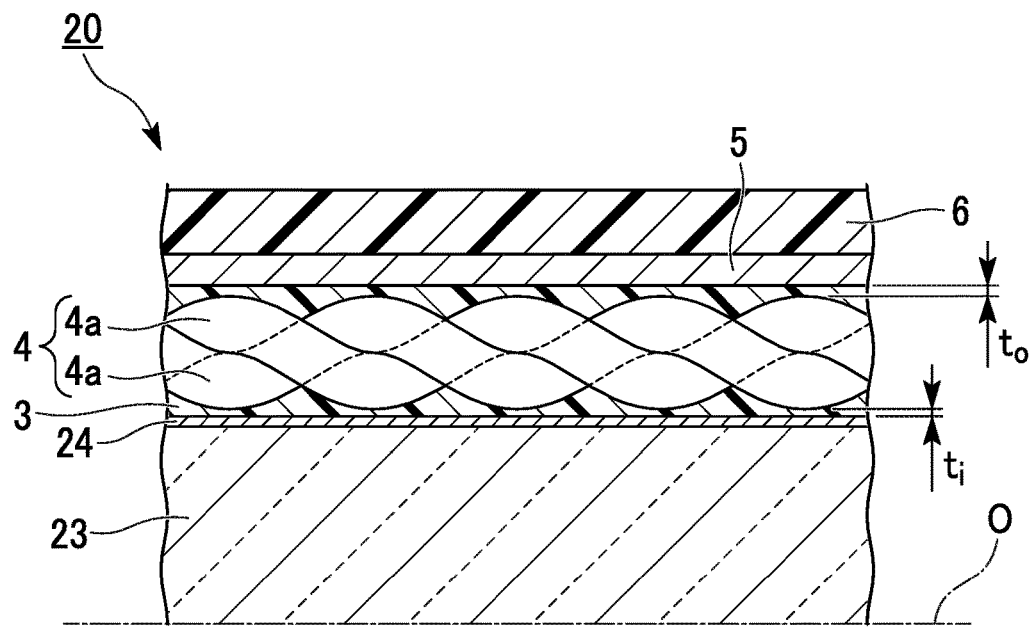
FIG. 4B is a sectional view taken along arrow X-X in FIG. 4A.

For example, as illustrated in FIGS. 4A and 4B, by keeping the outer diameter of the inner sheath 3 constant, the thickness $t_o$ of the inner sheath 3 on the outer side of the wire body 4 may periodically vary along the longitudinal direction.

Next, one or more embodiments of the present invention will be described, and the basic configuration is the same as that of the aforementioned embodiments. Therefore, the same reference numerals are given to similar configurations, the explanation thereof will not be repeated, and only different points will be described.

Figure 5:
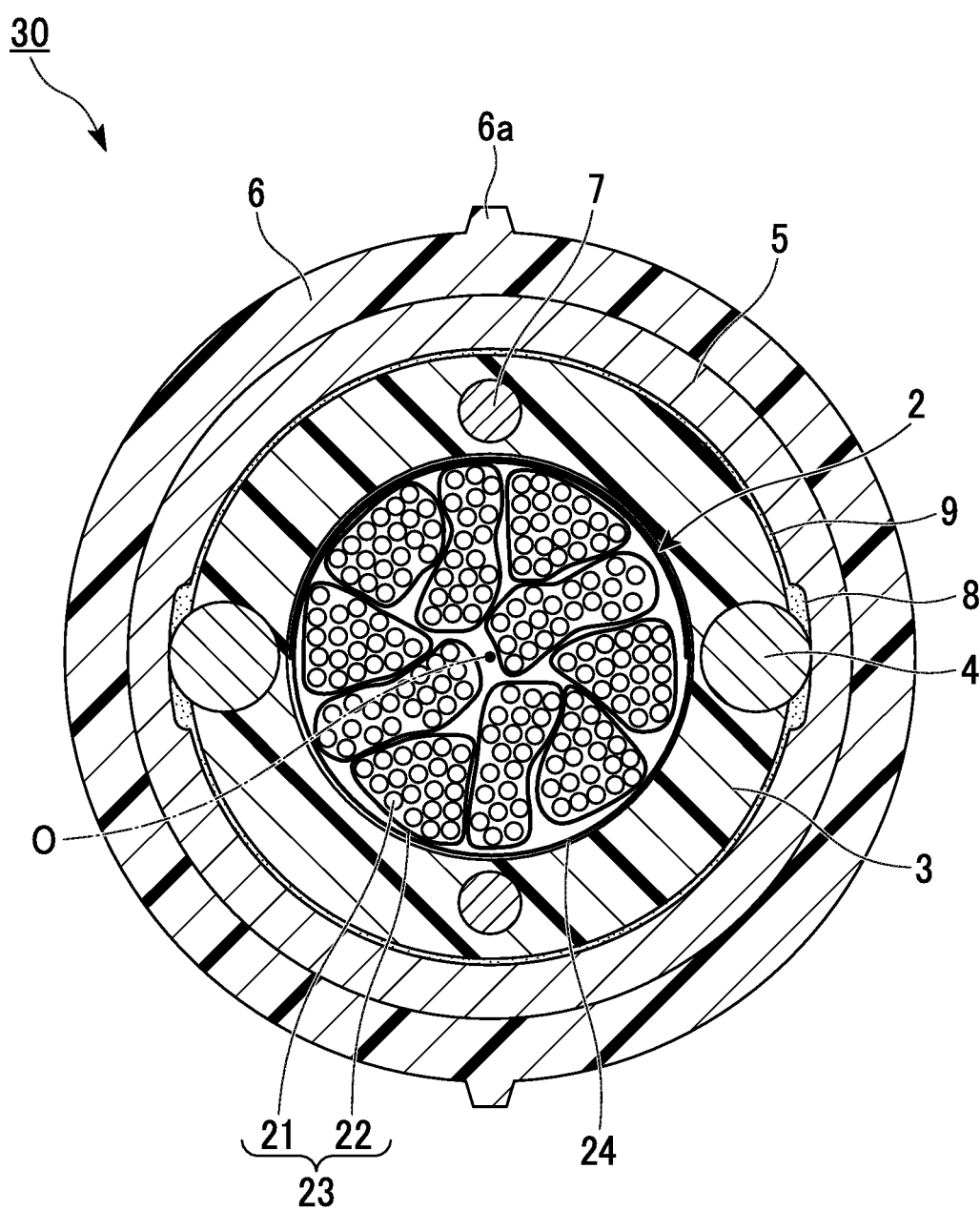
FIG. 5 is a cross-sectional view illustrating a structure of an optical fiber cable according to one or more embodiments of the present invention.

An optical fiber cable 30 of one or more embodiments illustrated in FIG. 5 differs from the aforementioned embodiments in that the wire body 4 is fixed to the reinforcing sheet 5.

As illustrated in FIG. 5, the wire body 4 of one or more embodiments is fixed to the reinforcing sheet 5 through a fixing portion 8 and a fixing layer 9. The fixing portion 8 is formed of, for example, an adhesive. The fixing layer 9 is formed, for example, by bonding a PET sheet to the inner peripheral surface of the reinforcing sheet 5 with the adhesive. The fixing layer 9 is formed over the entire inner peripheral surface of the reinforcing sheet 5. As a result, for example, even in a case where the reinforcing sheet 5 is formed of a metal which is difficult to adhere with the adhesive, it is possible to reliably fix the fixing layer 9 to the reinforcing sheet 5 by securing the adhesion area. By adhering and fixing the fixing layer 9 to the wire body 4 by the fixing portion 8, the wire body 4 and the reinforcing sheet 5 can be reliably adhered and fixed to each other.

The fixing portion 8 and the fixing layer 9 are not fixed to the inner sheath 3.

Table 3 illustrates the results of relative comparison of the outer diameter, the mass, and the draw-out-operation time for the optical fiber cable 100 (structure 1 in the related art), the optical fiber cable 10 (identified as Embodiments (1) in the table), the optical fiber cable 20 (identified as Embodiments (2) in the table), and the optical fiber cable 30 (identified as Embodiments (3) in the table).

In the comparative experiment, a PET sheet was adhered and fixed as the fixing layer 9 to the inner peripheral surface of the reinforcing sheet 5 of the optical fiber cable 30, and the fixing layer 9 and the wire body 4 were adhered and fixed to each other by the fixing portion 8 which is an epoxy resin type adhesive. Other conditions for the optical fiber cable 30 are the same as those in Embodiments (1) illustrated in Table 1.

TABLE 3

| Items | Structure 1 in the related art | Embodiments (1) | Embodiments (2) | Embodiments (3) |
|---|---|---|---|---|
| Outer diameter | 1 | 0.76 | 0.75 | 0.76 |
| Mass | 1 | 0.52 | 0.50 | 0.53 |
| Draw-out-operation time | 1 | 0.98 | 0.71 | 0.70 |

As illustrated in Table 3, the draw-out-operation time of Embodiments (3) is reduced by approximately 30% compared to Embodiments (1). The reason will be described below. In the optical fiber cable 30 of Embodiments (3), the wire body 4 is fixed to the reinforcing sheet 5 by the fixing portion 8 and the fixing layer 9. Therefore, as the reinforcing sheet 5 is cut and pushed out radially outward, the wire body 4 is drawn out from the inner sheath 3. Furthermore, the PET sheet as the fixing layer 9 is disposed between the reinforcing sheet 5 and the inner sheath 3 in a state of being adhered and fixed to the reinforcing sheet 5 and not fixed to the inner sheath 3. Therefore, the reinforcing sheet 5 is easily separated from the inner sheath 3 radially outward. As a result, in the optical fiber cable 30 of Embodiments (3), the draw-out-operation time is shorter than that of the optical fiber cable 10 of Embodiments (1).

As described above, according to the optical fiber cable 30 of one or more embodiments, since the wire body 4 is fixed to the reinforcing sheet 5, the wire body 4 is drawn out from the inner sheath 3 as the outer sheath 6 and the reinforcing sheet 5 are cut and pushed out radially outward. As a result, it is not necessary to draw out the wire body 4 from the inner sheath 3, and it is possible to make the draw-out-operation more efficient.

In the above embodiments, the adhesive is used as the fixing portion 8 and the PET sheet is used as the fixing layer 9, and the present invention is not limited thereto. For example, a portion of the reinforcing sheet 5 in the circumferential direction protrudes in a hook shape radially inward, and the wire body 4 is engaged with the protrusion portion with the hook shape. Accordingly, the wire body 4 and the reinforcing sheet 5 may be fixed to each other. In this case, the reinforcing sheet 5 to which the wire body 4 is fixed may be longitudinally wound around the core 2, and the inner sheath 3 may be molded by injecting molten resin or the like between the core 2 and the reinforcing sheet 5.

Next, one or more embodiments of the present invention will be described, and the basic configuration is the same as that of the aforementioned embodiments. Therefore, the same reference numerals are given to similar configurations, the explanation thereof will not be repeated, and only different points will be described.

Figure 6:
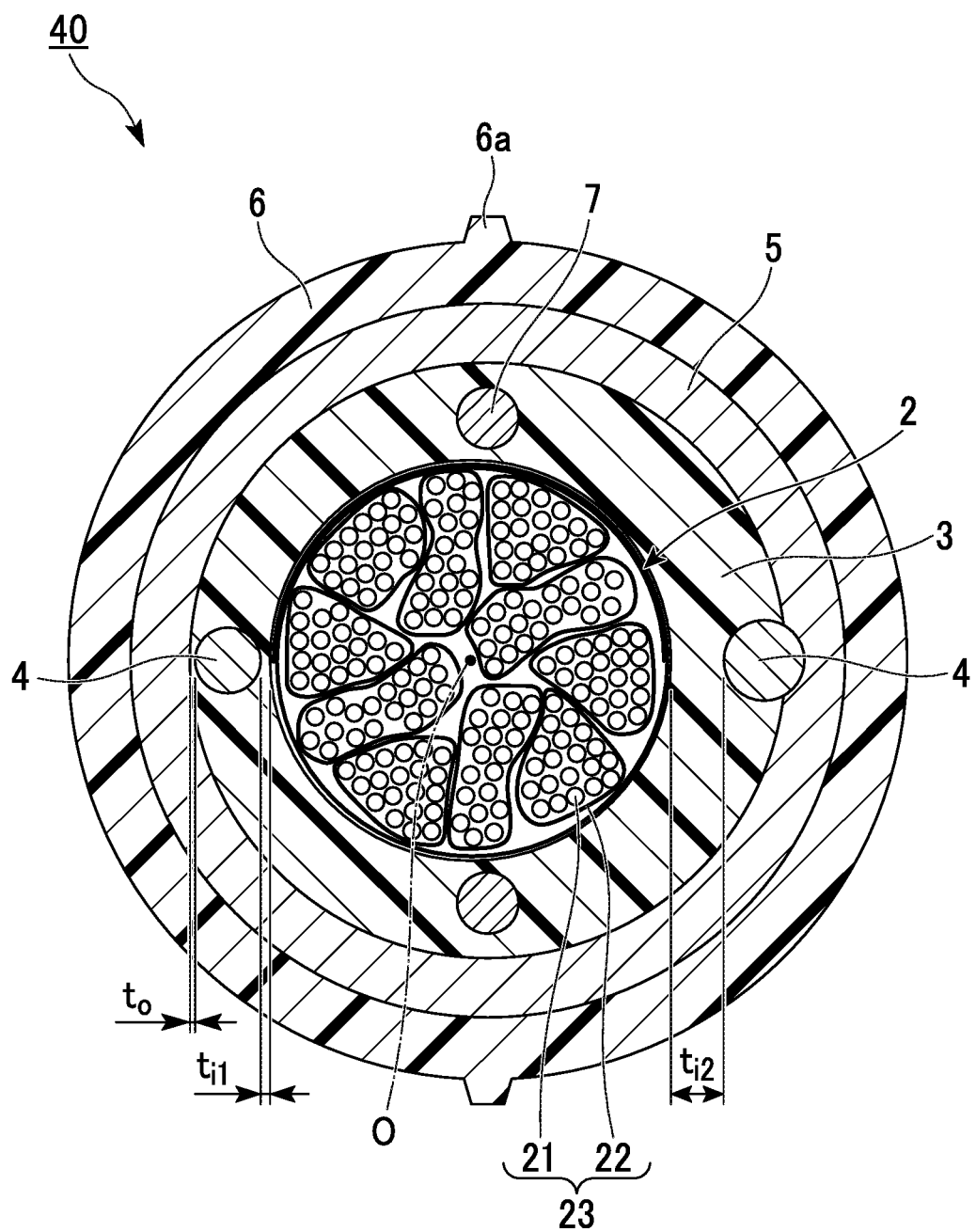
FIG. 6 is a cross-sectional view illustrating a structure of an optical fiber cable according to one or more embodiments of the present invention.

As illustrated in FIG. 6, an optical fiber cable 40 of one or more embodiments differs from the aforementioned embodiments in that the core 2 is disposed eccentrically with respect to the center axis O, and the thickness of the inner sheath 3 in the radial direction is uneven in the circumferential direction.

As illustrated in FIG. 6, in the radially inner portion from the wire body 4 of the inner sheath 3, the thickness with the smaller thickness is denoted by $t_{i1}$, and the thickness with the larger thickness is denoted by $t_{i2}$.

Figure 7:
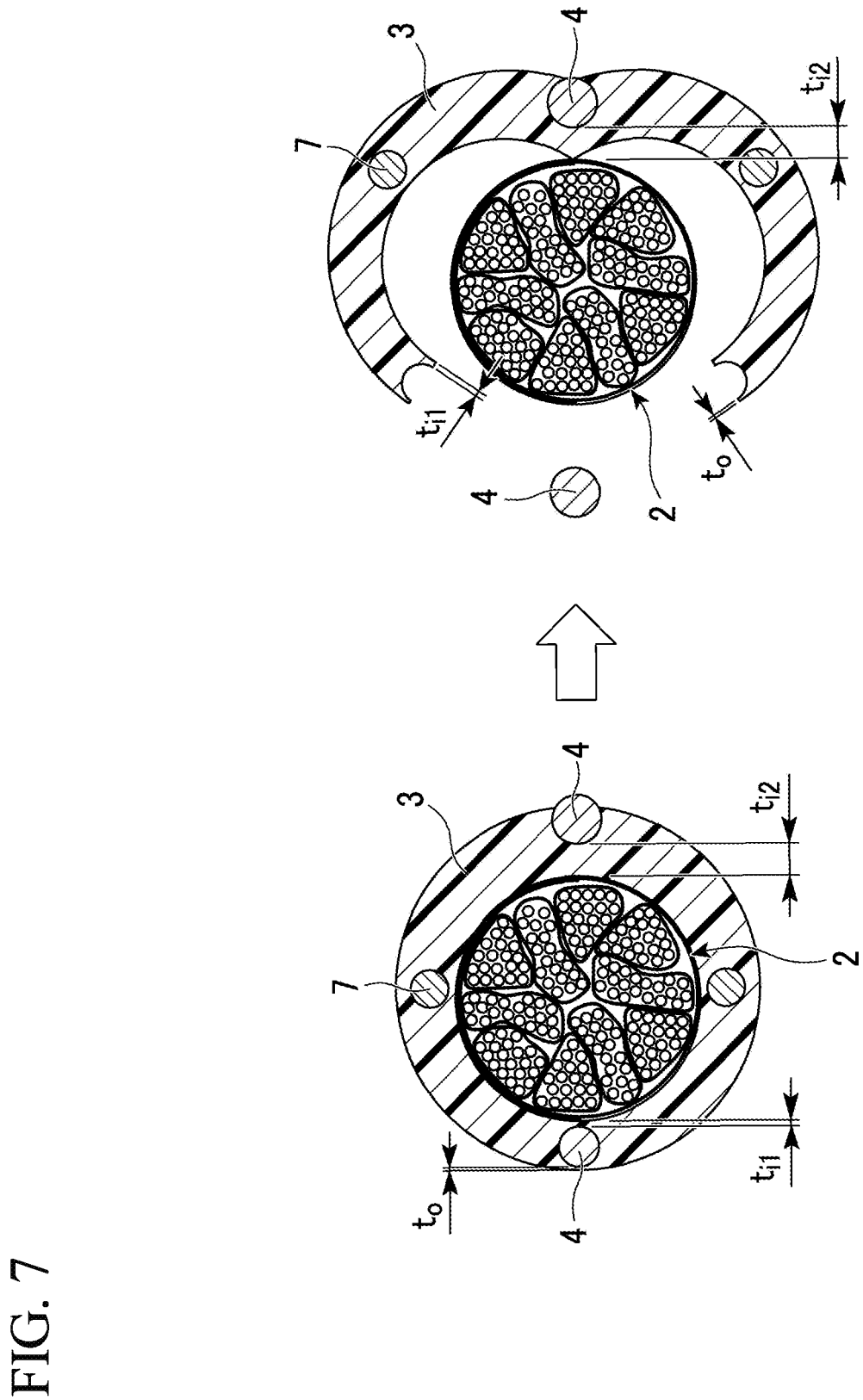
FIG. 7 is an explanatory view illustrating a step during a draw-out-operation of the optical fiber cable illustrated in FIG. 6.

FIG. 7 is an explanatory view extracting a step of the draw-out operation in the optical fiber cable 40 of one or more embodiments. In FIG. 7, the step of cutting the outer sheath 6 and the reinforcing sheet 5 with a tool is not repeated since the step is the same as the upper-left and upper-right parts of FIG. 2.

In the optical fiber cable 40 of one or more embodiments, by pulling the inner sheath 3 in the vertical direction in FIG. 7, the portion of the inner sheath 3 having the thickness $t_{i1}$ is broken. At this time, the stress due to the tension tends to concentrate on the portion having the thickness $t_{i1}$, so that the inner sheath 3 can be torn more easily.

Table 4 illustrates the results of comparing the draw-out operation time with the optical fiber cable 10 of the aforementioned embodiments or Embodiments (1) by changing the magnitudes of $t_{i1}$ and $t_{i2}$ in three steps for the optical fiber cable 40 of one or more embodiments or Embodiments (4-1), (4-2), (4-3).

TABLE 4

| Items | Embodiments (1) | Embodiments (4-1) | Embodiments (4-2) | Embodiments (4-3) |
|---|---|---|---|---|
| Inner sheath ratio of wire body ($t_{i2}/t_{i1}$) | 1 | 1.5 | 2.5 | 3.0 |
| Thickness of minimum inner sheath of wire body $t_{i1}$ (mm) | 0.3 | 0.3 | 0.2 | 0.2 |
| Draw-out-operation time | 1 | 0.65 | 0.62 | 0.63 |

The inner sheath ratio of the wire body illustrated in Table 4 illustrates a ratio ($t_{i2}/t_{i1}$) of $t_{i2}$ with respect to $t_{i1}$. In the example illustrated in Table 4, the value of $t_{i2}/t_{i1}$ was changed to 1.5 (Embodiments (4-1)), 2.5 (Embodiments (4-2)), and 3.0 (Embodiments (4-3)). The magnitude of $t_{i1}$ was changed to 0.3 mm (Embodiments (4-1)) and 0.2 mm (Embodiments (4-2) and (4-3)).

As is apparent from Table 4, the draw-out operation time of the optical fiber cable 40 of one or more embodiments is shorter than that of the optical fiber cable 10 of the aforementioned embodiments by 30% or more. This is due to the following reason.

In the optical fiber cable 10 of the aforementioned embodiments, since the thickness of the radially inner portion from the pair of wire bodies 4 of the inner sheath 3 is uniform, the stress is dispersed and acts when the inner sheath 3 is pulled in the radial direction. On the other hand, in the optical fiber cable 40 of one or more embodiments, the stress due to the tension is likely to concentrate on the portion $t_{t1}$ having a thickness smaller than $t_{t2}$ of the inner sheath 3. Therefore, it is possible to break the inner sheath 3 more easily, and the draw-out-operation time is shortened.

Next, one or more embodiments of the present invention will be described, and the basic configuration is the same as that of the aforementioned embodiments. Therefore, the same reference numerals are given to similar configurations, the explanation thereof will not be repeated, and only different points will be described.

An optical fiber cable 50 of one or more embodiments is different from the aforementioned embodiments in that the configuration of the inner sheath 3 is changed without disposing the wire body 4.

Figure 8:
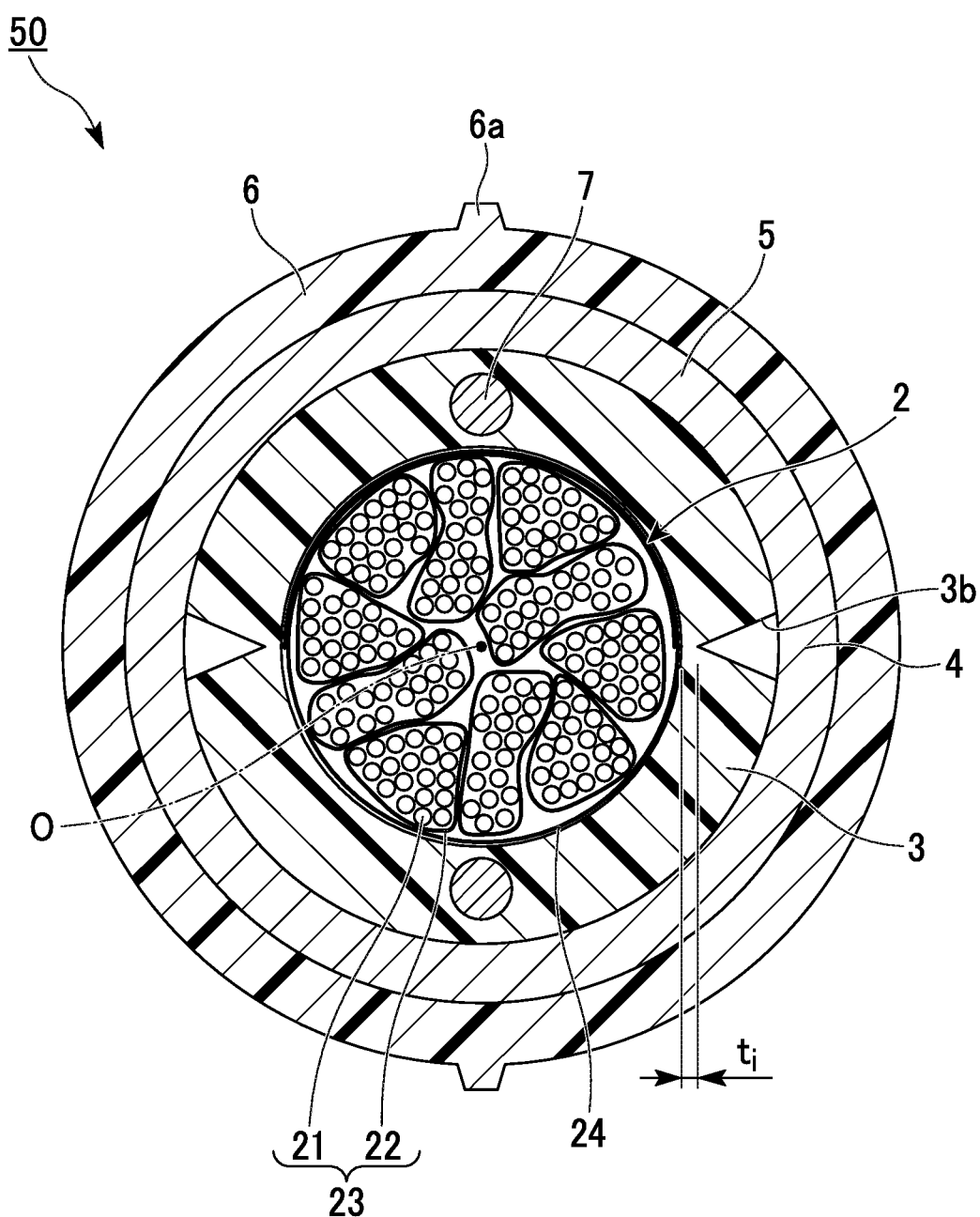
FIG. 8 is a cross-sectional view illustrating a structure of an optical fiber cable according to one or more embodiments of the present invention.

As illustrated in FIG. 8, the wire body 4 is not embedded in the inner sheath 3 of the optical fiber cable 50 of one or more embodiments. In addition, the inner sheath 3 is formed of a V-shaped groove portion (notch) 3b extending radially inward from the outer peripheral surface thereof. The width of the groove portion 3b gradually decreases in the circumferential direction inward radially. In the illustrated example, a pair of groove portions 3b are formed on the outer peripheral surface of the inner sheath 3 with the core 2 interposed therebetween.

In the inner sheath 3, the thickness $t_i$ in the radial direction at the portion adjacent to the bottom of the groove portion 3b is 0.1 to 0.3 mm.

According to the optical fiber cable 50 of one or more embodiments, when the inner sheath 3 is pulled in the vertical direction in FIG. 8, stress due to pulling is concentrated on the bottom of the groove portion 3b. As a result, the inner sheath 3 can be easily torn with the groove portion 3b as a starting point, and the optical fiber 21 can be drawn out.

The shape of the groove portion 3b is not limited to the V-shape, and other shapes may be adopted as long as stress concentrates on the bottom thereof. For example, the shape may be a U-shaped groove portion 3b which is recessed radially inwardly from the outer peripheral surface of the inner sheath 3 and has two corner portions in the cross section. Alternatively, a notch extending in the longitudinal direction may be provided on the outer peripheral surface of the inner sheath 3, and the notch may be formed as the groove portion 3b.

In addition, one or three or more groove portions 3b may be formed on the outer peripheral surface of the inner sheath 3.

Next, one or more embodiments of the present invention will be described, and the basic configuration is the same as that of the aforementioned embodiments. Therefore, the same reference numerals are given to similar configurations, the explanation thereof will not be repeated, and only different points will be described.

An optical fiber cable 60 of one or more embodiments differs from the aforementioned embodiments in that an opening 3a is formed on the outer peripheral surface of the inner sheath 3 and a portion of the surface of the wire body 4 is exposed to the outside through the opening 3a. In a case where the thickness $t_o$ of the inner sheath 3 on the inner side of the wire body 4 in the aforementioned embodiments is zero, the thickness is equal to that of one or more embodiments. The thickness $t_i$ on the inner side of the wire body 4 in one or more embodiments is set to be larger than 0 mm in order to prevent the inner sheath 3 from unexpectedly breaking.

Figure 9:
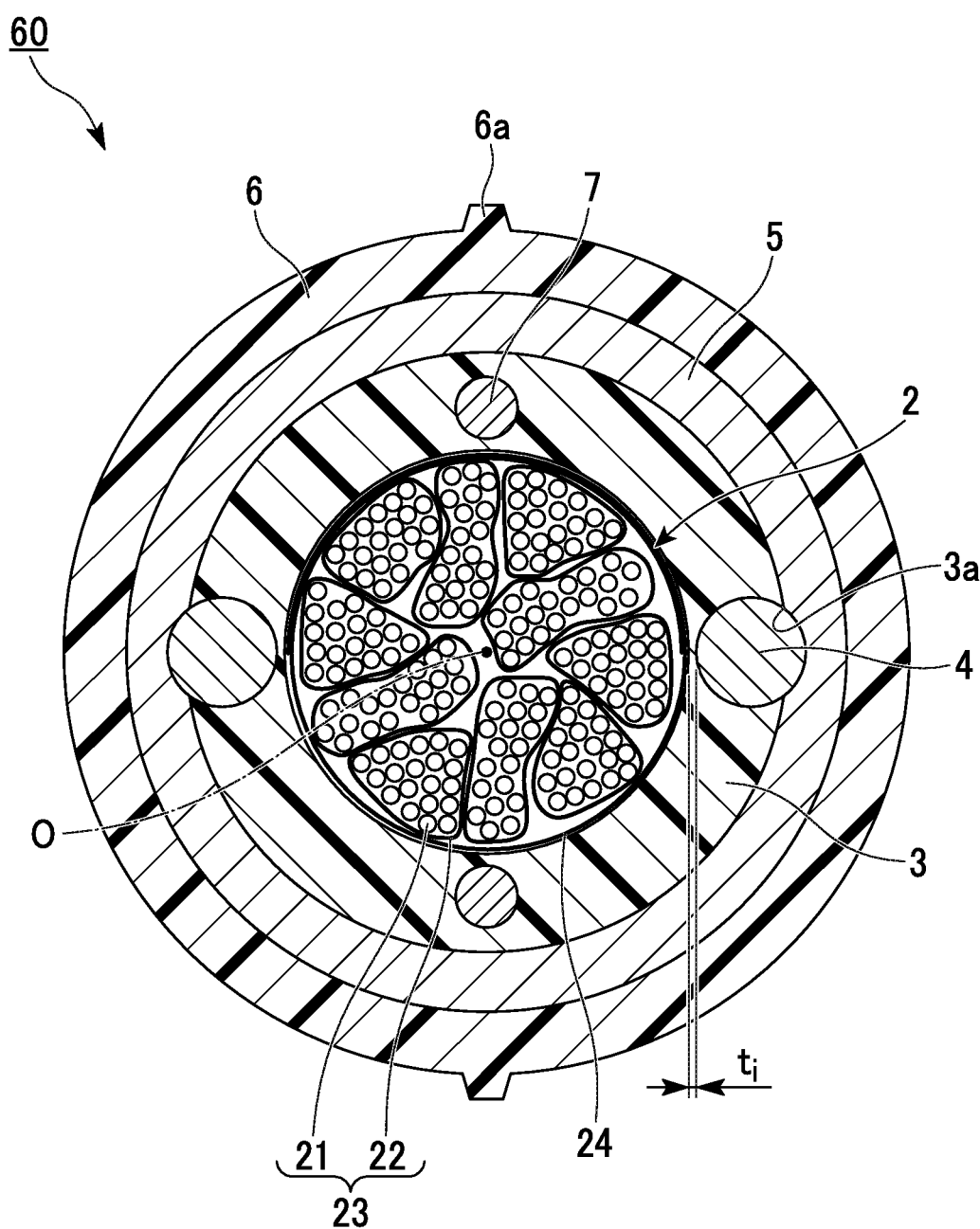
FIG. 9 is a cross-sectional view illustrating a structure of an optical fiber cable according to one or more embodiments of the present invention.

As illustrated in FIG. 9, a pair of openings 3a are formed on the outer peripheral surface of the inner sheath 3 of one or more embodiments. Each opening 3a extends over the entire length in the longitudinal direction of the inner sheath 3. Through the pair of openings 3a, each of the portions of the surfaces of the pair of wire bodies 4 is exposed to the outside of the inner sheath 3. The fact of "exposed to the outside" is not limited to a state where the wire body 4 is partially present in a space radially outside the outer peripheral surface of the inner sheath 3. For example, it also includes a state where the entire of the wire body 4 is present radially inside the outer peripheral surface of the inner sheath 3 and the wire body 4 is visible from the outside of the inner sheath 3 through the opening 3a.

According to the optical fiber cable 60 of one or more embodiments, the opening 3a is formed on the outer peripheral surface of the inner sheath 3 in which the wire body 4 is embedded, and the wire body 4 can be visually recognized from the outside of the inner sheath 3 through the opening 3a. Therefore, when the outer sheath 6 and the reinforcing sheet 5 are cut, the wire body 4 can be easily drawn out from the inner sheath 3. Since the portion of the inner sheath 3 having the thickness $t_i$ on the inner side of the wire body 4 is thin, it is possible to draw out the optical fiber 21 easily by tearing the inner sheath 3 from this portion of $t_i$ as a starting point.

In one or more embodiments, approximately ¾ of the diameter of the wire body 4 is positioned inside the inner sheath 3, and the remaining approximately ¼ thereof is positioned outside the inner sheath 3. The proportion of the portion of the wire body 4 positioned inside the inner sheath 3 is not limited to the above and may be changed as appropriate.

The technical scope of the present invention is not limited to the aforementioned embodiments, and various modifications can be made without departing from the gist of the present invention.

For example, in the aforementioned embodiments, the optical fiber cable provided with the tension member 7 has been described. Accordingly, for example, the strength against the tension of the optical fiber cable may be secured by using the wire body 4 or the reinforcing sheet 5 without using the tension member 7. In addition, in this case, the protrusion 6a may be formed on a portion of the outer peripheral surface of the outer sheath 6 where the wire body 4 is positioned radially inward. As a result, when cutting the outer sheath 6 and the reinforcing sheet 5 with the tool, since the tip end of the tool abuts against the wire body 4, it is possible to prevent the tool from entering radially inward from the wire body 4 and cutting the optical fiber 21.

In addition, in the above embodiments, the wire body 4 and the tension member 7 are disposed at symmetrical positions with respect to the core 2, and the present invention is not limited thereto. Accordingly, these members 4 and 7 may be disposed at asymmetrical positions with respect to the core 2 in cross-sectional view.

In addition, in the above embodiments, the thickness $t_i$ of the inside of the wire body 4 in the inner sheath 3 is 0.3 mm or less, and the thickness is not limited thereto. Accordingly, other thickness may be used as long as it can be easily torn by hand. For example, in one or more embodiments, the V-shaped groove portion 3b is formed in the inner sheath 3, and the stress is likely to concentrate more when the inner sheath 3 is pulled than in the other embodiments, so that the thickness $t_i$ of the inside of the wire body 4 may be 0.3 mm or more.

In addition, within the scope not deviating from the gist of the present invention, it is possible to appropriately replace the constituent elements in the above-described embodiments with well-known constituent elements, and the above-described embodiments and modified examples may be appropriately combined.

For example, by combining the aforementioned embodiments, a yarn obtained by twisting fibers as the wire body 4 may be used, and the wire body 4 may be fixed to the reinforcing sheet 5 via the fixing portion 8 and the fixing layer 9. In this case, by using the adhesive as the fixing portion 8, the adhesive can be infiltrated between fibers of the wire body 4, and the wire body 4 and the reinforcing sheet 5 can be adhered more firmly to each other.

In addition, by combining the aforementioned embodiments, and using the wire body 4 having a pointed shape radially inward, the groove portion 3b in which the width in the circumferential direction gradually decreases radially inward may be formed in the inner sheath 3 after the wire body 4 has been removed. In this case, it is possible to easily form the groove portion 3b on the outer peripheral surface of the inner sheath 3.

Figure 10A:
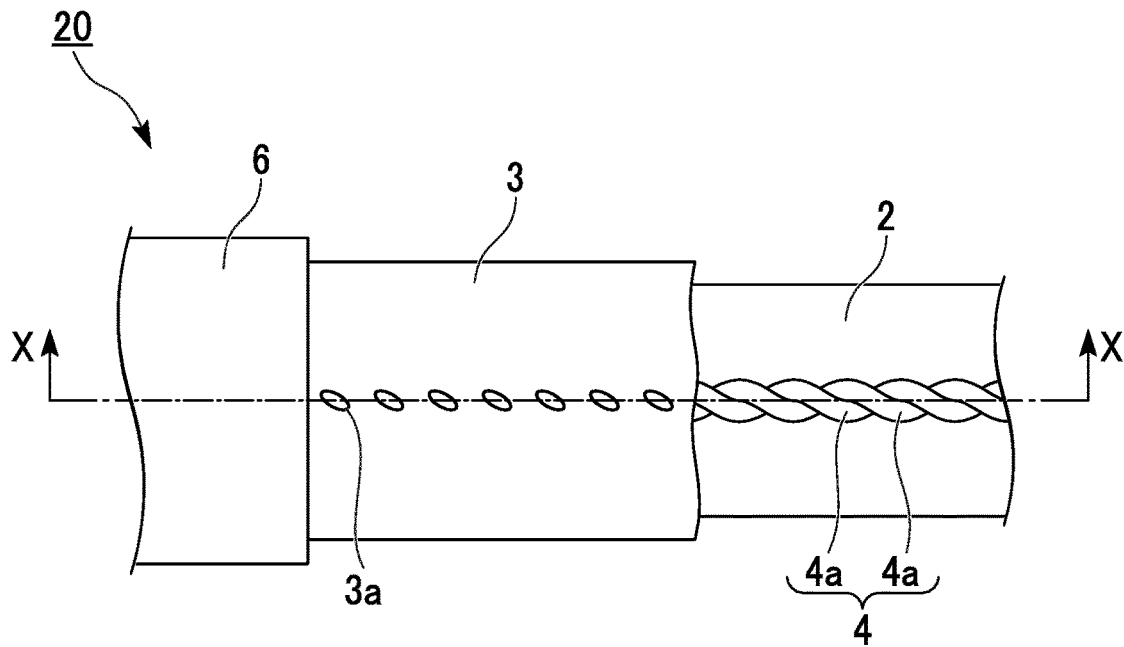
FIG. 10A is an explanatory view illustrating a structure of an optical fiber cable according to one or more embodiments of the present invention.
Figure 10B:
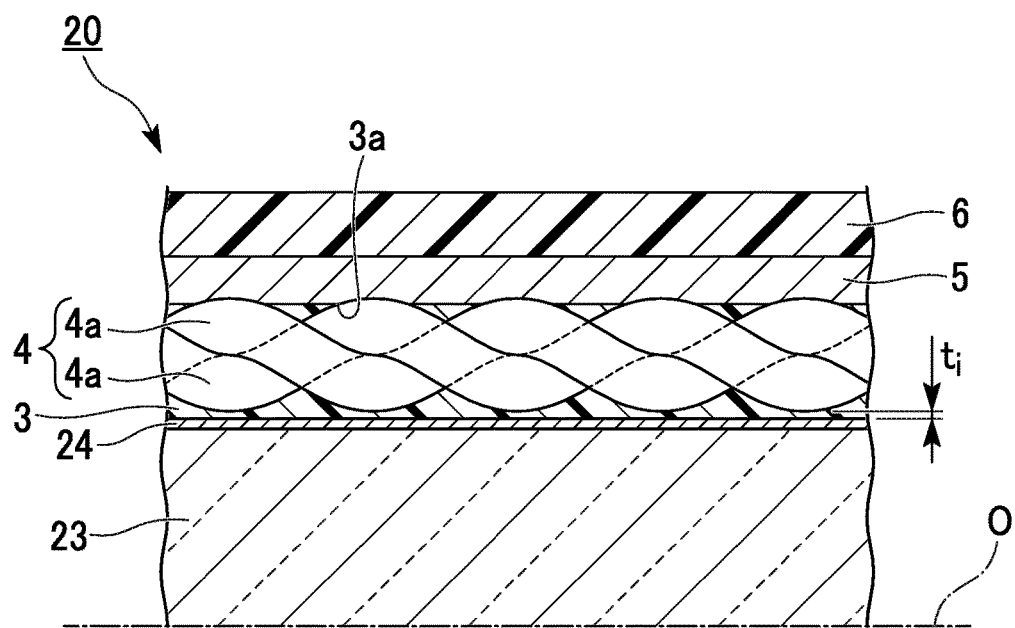
FIG. 10B is a sectional view taken along arrow X-X in FIG. 10A.

In addition, by combining the aforementioned embodiments, the configuration illustrated in FIGS. 10A and 10B may be adopted. In the example illustrated in FIG. 10A, the plurality of openings 3a are formed at equal intervals in the longitudinal direction on the surface of the inner sheath 3. As a result, the surface of the wire body 4 is exposed to the outside of the inner sheath 3 through the plurality of openings 3a. As illustrated in FIG. 10B, the position in the radial direction on the outer peripheral surface of the inner sheath 3 in the longitudinal sectional view is substantially uniform along the longitudinal direction. On the other hand, in the longitudinal sectional view, the position in the radial direction on the surface of the wire body 4 periodically varies along the longitudinal direction, and the radially outer portion and the radially inner portion on the outer peripheral surface of the inner sheath 3 are alternately arranged in the longitudinal direction.

In the example illustrated in FIGS. 10A and 10B, since the area of each opening 3a is suppressed small, for example, even when the inner sheath 3 is immersed in a liquid and cooled during manufacturing the optical fiber cable 20, it is difficult for liquid to enter through the opening 3a. In a case of using a yarn obtained by twisting fibers as the wire body 4, in particular, it is advantageous in that the wire body 4 can be visually recognized through the opening 3a while preventing the coolant from penetrating into the wire body 4 due to the capillary phenomenon.

Furthermore, since the plurality of openings 3a are formed at intervals in the longitudinal direction on the outer peripheral surface of the inner sheath 3, the inner sheath 3 is unlikely to break unexpectedly, as compared with a case where an opening 3a is formed without a cut line along the longitudinal direction, for example. As a result, in the operation of removing the outer sheath 6 and the reinforcing sheet 5, the inner sheath 3 is unexpectedly broken to expose the core 2, and it is possible to prevent the optical fiber 21 from being injured.

Although the disclosure has been described with respect to only a limited number of embodiments, those skill in the art, having benefit of this disclosure, will appreciate that various other embodiments may be devised without departing from the scope of the present invention. Accordingly, the scope of the invention should be limited only by the attached claims.

REFERENCE SIGNS LIST 10, 20, 30, 40, 50, 60: optical fiber cable, 2: core, 3: inner sheath, 3a: opening, 4: wire body, 4a: element wire, 5: reinforcing sheet, 6: outer sheath, 6a: protrusion (mark portion), 7: tension member, 100: optical fiber cable (structure 1 in the related art), 200: optical fiber cable (structure 2 in the related art)

The invention claimed is:

1. An optical fiber cable, comprising:
a core comprising gathered optical fibers;
an inner sheath housing the core;
a pair of wire bodies embedded in the inner sheath;
a pair of tension members embedded in the inner sheath, wherein the core is interposed between the tension members;
a reinforcing sheet that covers the inner sheath; and
an outer sheath that covers the reinforcing sheet, wherein in the inner sheath, $t_i < T_i$ and $t_o < T_o$ are satisfied, where
$t_i$ is a thickness of a radially inner portion of the inner sheath between the core and each of the wire bodies,
$T_i$ is a thickness of a radially inner portion of the inner sheath between the core and each of the pair of tension members,
$t_o$ is a thickness of a radially outer portion of the inner sheath between each of the wire bodies and the reinforcing sheet, and
$T_o$ is a thickness of a radially outer portion of the inner sheath between each of the pair of tension members and the reinforcing sheet, and
the inner sheath is configured to separate from the core when the wire bodies are drawn out and to rip a part of the inner sheath where the thickness is $t_o$.

2. The optical fiber cable according to claim 1, wherein the core is interposed between the pair of wire bodies.

3. The optical fiber cable according to claim 1, wherein mark portions are disposed in an outer peripheral surface of the outer sheath where the pair of tension members are positioned radially inward.

4. The optical fiber cable according to claim 1, wherein a portion of a surface of each of the wire bodies is exposed to an outside of the inner sheath through an opening in an outer peripheral surface of the inner sheath.

5. The optical fiber cable according to claim 4, wherein a portion of each of the wire bodies is fixed to the reinforcing sheet.

6. The optical fiber cable according to claim 4, wherein the outer peripheral surface of the inner sheath has a plurality of openings at intervals in a longitudinal direction, and
the surface of each of the wire bodies is exposed to the outside of the inner sheath through the openings.

7. The optical fiber cable according to claim 1, wherein each of the wire bodies is composed of a plurality of twisted element wires.

8. The optical fiber cable according to claim 1, wherein $0.1 \text{ [mm]} \leq t_i \leq 0.3 \text{ [mm]}$ is satisfied.

9. The optical fiber cable according to claim 1, wherein $t_o \leq 0.3 \text{ [mm]}$ is satisfied.

10. The optical fiber cable according to claim 1, wherein 0.1 [mm]≤$t_o$≤0.3 [mm] and $t_i$=0 [mm] are satisfied.

11. The optical fiber cable according to claim 1, wherein each of the wire bodies and each of the tension members are alternately disposed at equal intervals in a circumferential direction.

\* \* \* \* \*